United States Patent
Adams et al.

(10) Patent No.: US 6,181,785 B1
(45) Date of Patent: Jan. 30, 2001

(54) METHOD AND APPARATUS IN A COMMUNICATIONS SYSTEM FOR PROVIDING AUTOMATED POST CALL CHARGES

(75) Inventors: Rodney Glen Adams, Rowlett; Garnet Gordon Cameron, Dallas; Rita Rae Davenport D'Ingianni, Richardson; Raman Lad, Plano; Nimesh Shah, Plano; Lester Son-Hing, Plano, all of TX (US)

(73) Assignee: Nortel Networks Corporation, Montreal (CA)

( * ) Notice: Under 35 U.S.C. 154(b), the term of this patent shall be extended for 0 days.

(21) Appl. No.: 08/940,792

(22) Filed: Sep. 30, 1997

(51) Int. Cl.[7] .................................................. H04M 15/00
(52) U.S. Cl. .................... 379/114; 379/67.1; 379/115; 379/121; 379/127
(58) Field of Search ..................... 379/114, 115, 379/116, 118, 120, 121, 127, 130, 140, 70, 81, 84, 88.16, 88.11, 88.18, 88.19, 88.21

(56) References Cited

U.S. PATENT DOCUMENTS

| | | | | |
|---|---|---|---|---|
| 4,726,056 | * | 2/1988 | An et al. ............................... | 379/115 |
| 5,506,893 | * | 4/1996 | Buscher et al. ....................... | 379/114 |
| 5,748,718 | * | 5/1998 | Manicone .............................. | 379/131 |
| 5,799,060 | * | 8/1998 | Kennedy et al. ....................... | 379/29 |
| 5,946,670 | * | 8/1999 | Motohashi et al. ................... | 705/400 |

* cited by examiner

Primary Examiner—Curtis A. Kuntz
Assistant Examiner—Binh K. Tieu
(74) Attorney, Agent, or Firm—Christopher O. Edwards; Felsman, Bradley, Vaden, Gunter & Dillon, LLP (57) ABSTRACT

A method and apparatus in a communications system for providing post call information to a caller using a data processing system within the communications system. The processes of the present invention are implemented in a data processing system within the communications system. A connection of the caller to the communications system is detected in which the caller is initiating a call for which post call charge information is desired. The post call charge information for the call is automatically identified in response to termination of the call by the caller. The post call charge information is automatically presented to the caller.

32 Claims, 11 Drawing Sheets

METHOD AND APPARATUS IN A COMMUNICATIONS SYSTEM FOR PROVIDING AUTOMATED POST CALL CHARGES

BACKGROUND OF THE INVENTION

1. Technical Field

The present invention relates generally to an improved communications system and in particular to a method and apparatus for presenting charges for a call after termination of the call. Still more particularly, the present invention relates to a method and apparatus in a communications system for automatically sending post call charges to a communications unit after the call has been terminated.

2. Description of the Related Art

Recent advances in technology have resulted in unprecedented growth and diversification in the field of communications. Communications systems, long used for transmitting voice signals between telephones, are now being implemented in a wide variety of other applications. Such applications include, for example, the transfer of information between local area networks (LANs) and the transmission of documents via facsimile. The wide variety of available communications applications has resulted in a marked increase in the use of communications systems.

Communications system use has also increased as a result of the greater number of telephone devices now available. With the advent of devices such as portable and cellular telephones, more people spend a greater amount of time in telephonic communication than in the past.

These factors have contributed to a general increase in the use of communications systems and, in particular, to an increase in the use of communications systems for sending long distance and international transmissions. The dramatic social and economic changes which the world has undergone in the past several years have also resulted in the increased use of long distance and international communications systems. The current socioeconomic climate of the world suggests that the number of long distance and international transmissions will continue to grow at an increased rate.

Long distance and cellular customers currently must either wait for a billing statement or contact a customer representative for the billing company whose telephony services are used in order to inquire about the specific costs assessed for a call. The rates in effect may vary depending upon factors such as, for example, the time at which a call is placed, the geographic location of the calling party and the called party, activated special features, and discounts in effect. For cost conscious consumers, obtaining charges soon after a call is made (before receiving the telephone bill) aids in budgeting and planning other calls that may require charges. With the present process for calls already made, obtaining such information can be tedious and frustrating or too untimely to aid in day-to-day budgeting. Therefore, it would be advantageous to have an improved method and apparatus for obtaining post call charge information.

SUMMARY OF THE INVENTION

The present invention provides a method and apparatus in a communications system for providing post call billing information to a caller using a data processing system within the communications system. The processes of the present invention are implemented in a data processing system within the communications system. A connection of the caller to the communications system is detected in which the caller is initiating a call for which post call charge information is desired. The post call charge information for the call is automatically identified in response to termination of the call by the caller. The post call charge information is automatically presented to the caller after terminating the connection with the caller.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
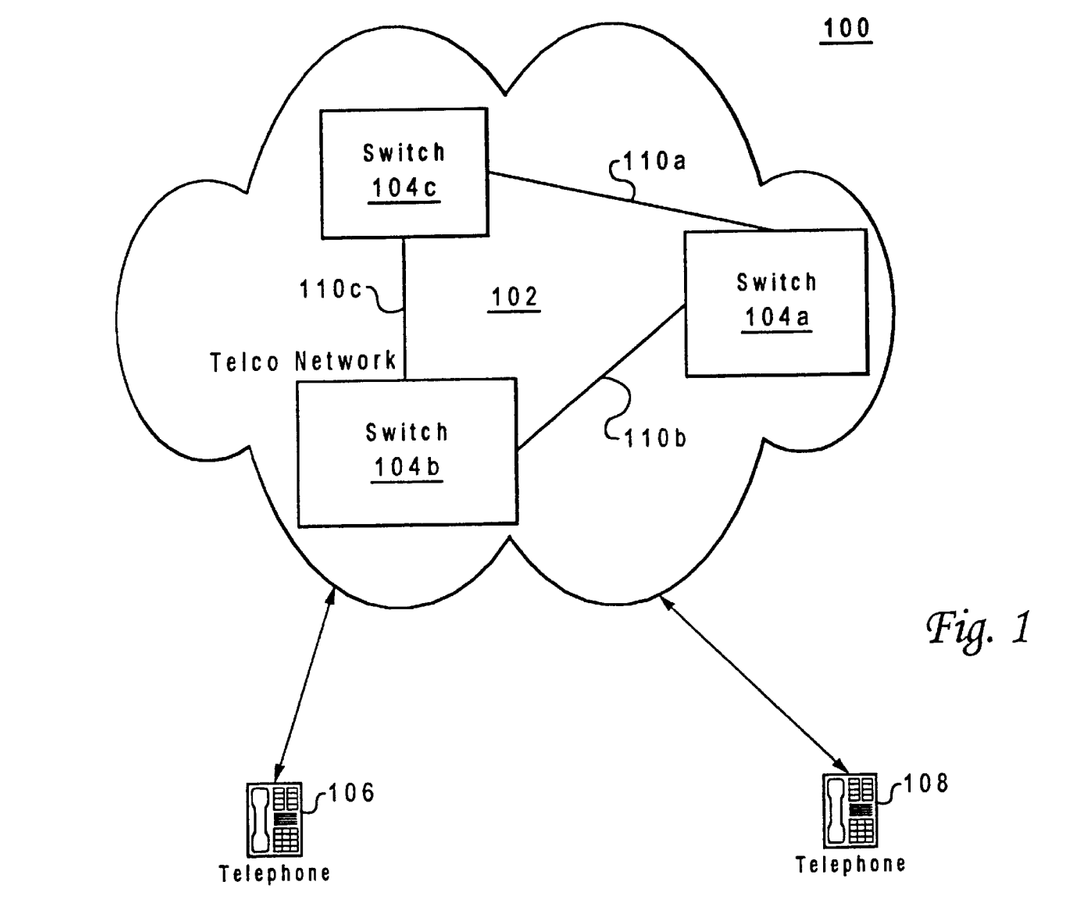
FIG. 1 is a diagram of a communications system in which a preferred embodiment of the present invention may be implemented.

With reference now to the figures and in particular with reference to FIG. 1, a diagram of a communications system 100 is depicted in which a preferred embodiment of the present invention may be implemented. Communications system 100 in FIG. 1 includes a telecommunications network 102, also called a "Telco Network". Telecommunications network 102 may be, for example, a local exchange carrier (LEC), an interexchange carrier (IEC), or a hybrid network. In the case that telecommunications network 102 is in the form of a hybrid network, such a network may include landline and/or wireless communications systems. In the case that a call involves long distance service, the IEC is the service provider for the call within telecommunications network 102. Telecommunications network 102 also includes a number of switches 104a–104c, which provides establishing and routing a call between source customer premises equipment (CPE) 106 and target CPE 108.

Switches 104a–104c interconnect transmission facilities and are employed to route traffic throughout telecommunications network 102. Transmission facilities provide communications paths 110a–110c to carry a user's voice and network control information between switches in a network. Generally, transmission facilities include a medium, such as, for example, air, copper wires, coaxial cables, or fiber optic cables, along with electronic equipment employed to amplify and/or relay signals. CPE, also called "station equipment", is generally located at a user's premises. The depicted example contains three switches and three communications paths for illustrative purposes only. Depending on the system, other numbers of switches, communications paths, and configurations thereof may be employed. The function of CPE is to transmit and receive user information and exchange control information with telecommunications network 102 to place calls and access services from telecommunications network 102. CPE may be a communications unit, such as, for example, a telephone, a computer, or a fax machine.

Figure 2:
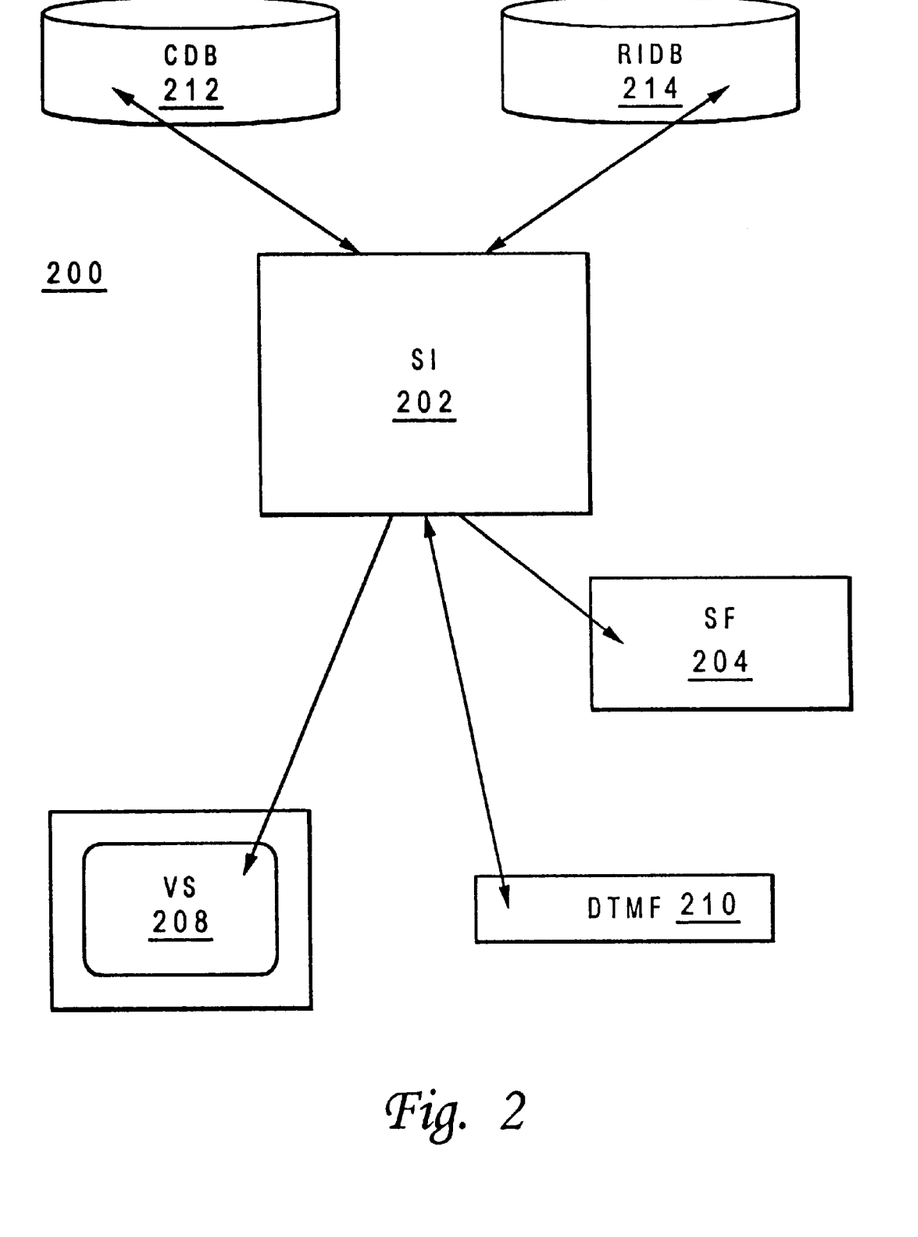
FIG. 2 is a functional block diagram of a switch in accordance with a preferred embodiment of the present invention.

The process of the present invention may be implemented in a data processing system within telecommunications network 102. For example, the data processing system may be implemented as a switch or as a computer having a connection to the switch. Turning now to FIG. 2, a functional block diagram of data processing system 200 is depicted in accordance with a preferred embodiment of the present invention. Data processing system 200 is an example of a data processing system in which a preferred embodiment of the present invention may be implemented. In particular, data processing system 200 in FIG. 2 contains hardware that is depicted in functional units in accordance with a preferred embodiment of the present invention. Some of the functional units described below for data processing system 200 may be configured in different physical units depending on the implementation. Examples of physical implementations are described below with reference to FIGS. 3A and 3B.

In FIG. 2, data processing system 200 contains switch intelligence (SI) 202, which includes the logic for call processing and providing pre-call information in accordance with the preferred embodiment of the present invention. In addition, data processing system 200 includes switch fabric 204, which contains the communications links and other switch hardware used to connect callers to the switch and to each other. Voice server (VS) 208 contains multiple independent voice channels or paths for sending messages. In the depicted example, each of the voice channels are referred to as voice ports. For example, voice server 208 may contain three voice ports identified as VP1, VP2, and VP3. Data processing system 200 also includes a DTMF detector 210 for detecting DTMF tones that may be transmitted by a user. Depending upon the implementation, voice recognition equipment may be used in place of or in addition to DTMF detector 210. Customer database (CDB) 212 is a database containing information on customers used to determine charges for calls from a source location to various target locations. Different customers may have different rates in effect based on the particular plan subscribed to by the customer. Additionally, rates also may vary depending on factors, such as, for example, the time at which a call is placed, the geographic location of the calling party and of the called party, currently activated special features, and discounts currently in effect for a particular customer. Depending on the long distance or cellular service selected by the customer and the particular plan chosen, different customers may have different rates even though they initiate calls at the same time of the day to the same geographic location. This customer database may be queried to obtain post call charge information in accordance with the preferred embodiment of the present invention. Routing information database (RIDB) 214 is a database containing routing information for call processing.

The processes of the present invention may be implemented in a data processing system, such as a switch. The present invention also may be implemented in other data processing systems. For example, the processes of the present invention may be implemented within a computer having a connection to a switch in which the computer provides the logic and commands to the switch to provide the processes used to provide post call charge information to a customer.

Figure 3A:
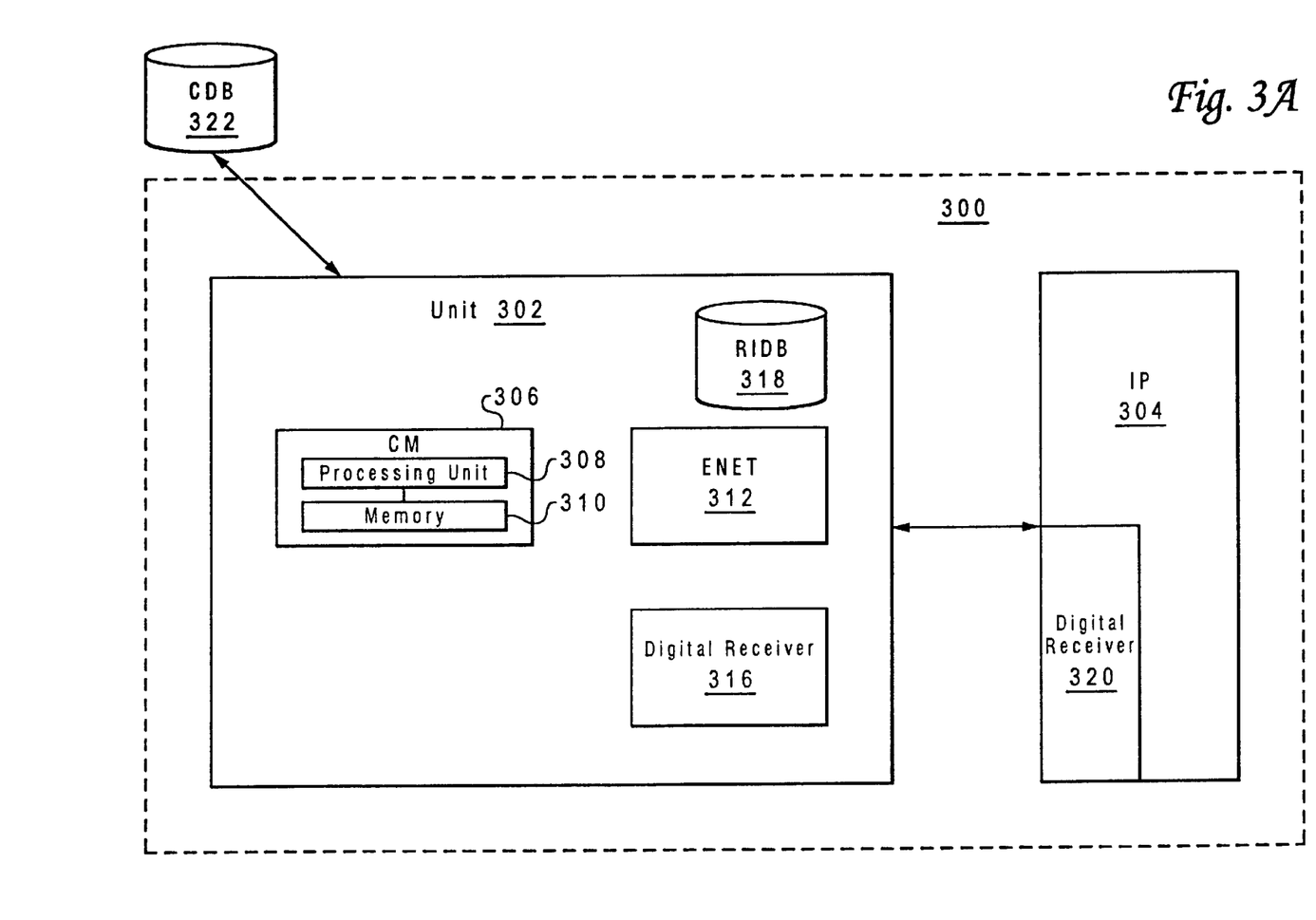
FIG. 3A is a block diagram of a switch in accordance with a preferred embodiment of the present invention.
Figure 3B:
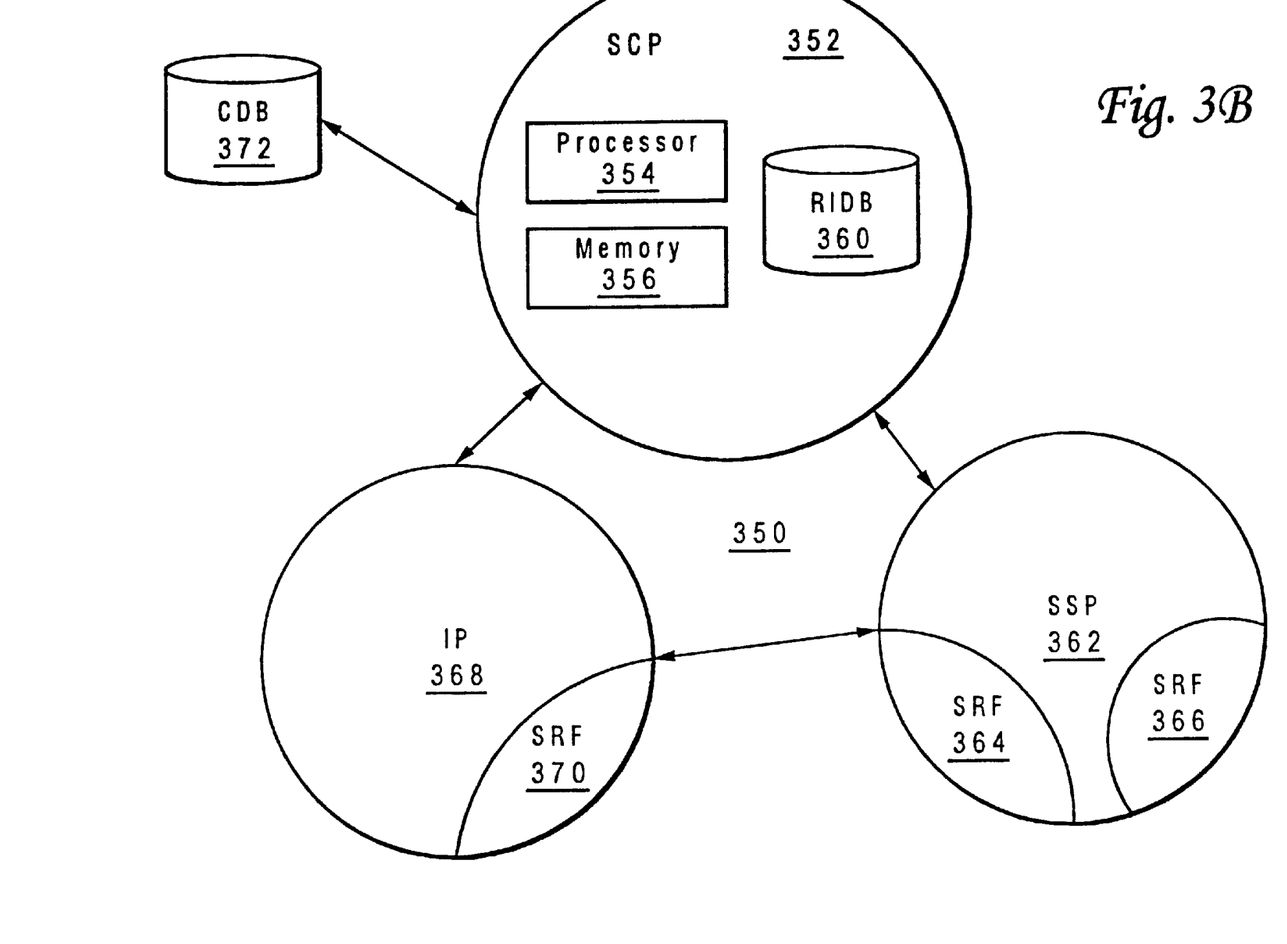
FIG. 3B is a block diagram of physical components in an intelligent network in accordance with a preferred embodiment of the present invention.

Turning now to FIGS. 3A–3B, block diagrams illustrating physical components of switches are depicted in which a preferred embodiment of the present invention may be implemented. FIG. 3A is a physical block diagram of switch 300, which is representative of the DMS family of switch products available from Nortel. Switch 300 in FIG. 3A may be implemented within communications system 100, in switches such as switches 104a, 104b, or 104c in FIG. 1.

In FIG. 3A, switch 300 includes unit 302 connected to intelligent peripheral 304. Unit 302 contains a computing module (CM) 306, which provides switch intelligent functions for switch 300. Computing module 306 contains processing unit 308 and memory 310. Processing unit 308 may contain, for example, one or more microprocessors for executing instructions to provide logic for call processing and processes for providing post call charge information in accordance with the preferred embodiment of the present invention. Memory 310 stores instructions and data and may include random access memory (RAM) and/or read only memory (ROM).

Unit 302 also includes enhanced network (ENET) 312, which provides a switch fabric function. Digital receiver 316 provides DTMF functions. Unit 302 also contains routing information database 318 similar to RIDB 214 in FIG. 2. Voice server functions are provided by intelligent peripheral (IP) 306. Additionally, intelligent peripheral also contains digital receiver 320. Digital receivers 316 and 320 may provide voice recognition functions in place of or in addition to recognizing DTMF tones.

Switch 300 has a connection to customer database (CDB) 322, which is external to switch 300. Customer database 322 is in communication with unit 302 through enhanced network 312.

Turning now to FIG. 3B, a physical block diagram of physical components in an intelligent network (IN) 350 is depicted in accordance with the preferred embodiment of the present invention. In the depicted example, intelligent network 350 is representative of an International Telecommunications Union switch defined by ITU-T Q.1200. Intelligent network 350 includes a service control point (SCP) 352, which is the switch intelligence for intelligent network 350. Within service control point 352 is a processor unit 354 and a memory 356, which contain the processing logic for providing pre-call rate processing in the depicted example. Additionally, service control point 352 also contains routing information database (RIDB) 360. Intelligent network 350 also contains a service switch platform (SSP) 362, which provides switch fabric functions. Specialized resource functions (SRFs) 364 and 366 are found within service switch platform 362. Specialized resource function (SRF) 364 provides DTMF functions for recognizing signals from consumer premises equipment. Intelligent peripheral (IP) 368 also is a part of intelligent network 350 and provides voice server functions. Additionally, within intelligent peripheral 368 is specialized resource function 370, which also serves to provide DTMF functions. Alternatively, instead of DTMF functions, specialized resource functions 364 and 366 may be employed to provide voice recognition in place of or in addition to recognizing DTMF tones. Specialized service control point 352 is in communication with customer database (CDB) 372, which is external to intelligent network 350.

Although in the depicted examples in FIGS. 1, 2, 3A and 3B, the processes of the present invention are implemented in a switch, the present invention also may be implemented in other data processing systems. For example, the processes of the present invention may be implemented within a computer having a connection to a switch in which the computer provides the logic and commands to the switch to provide the processes used to determine post call charge information for a customer after termination of a call, which in the depicted examples are a long distance or cellular phone call.

Figure 4:
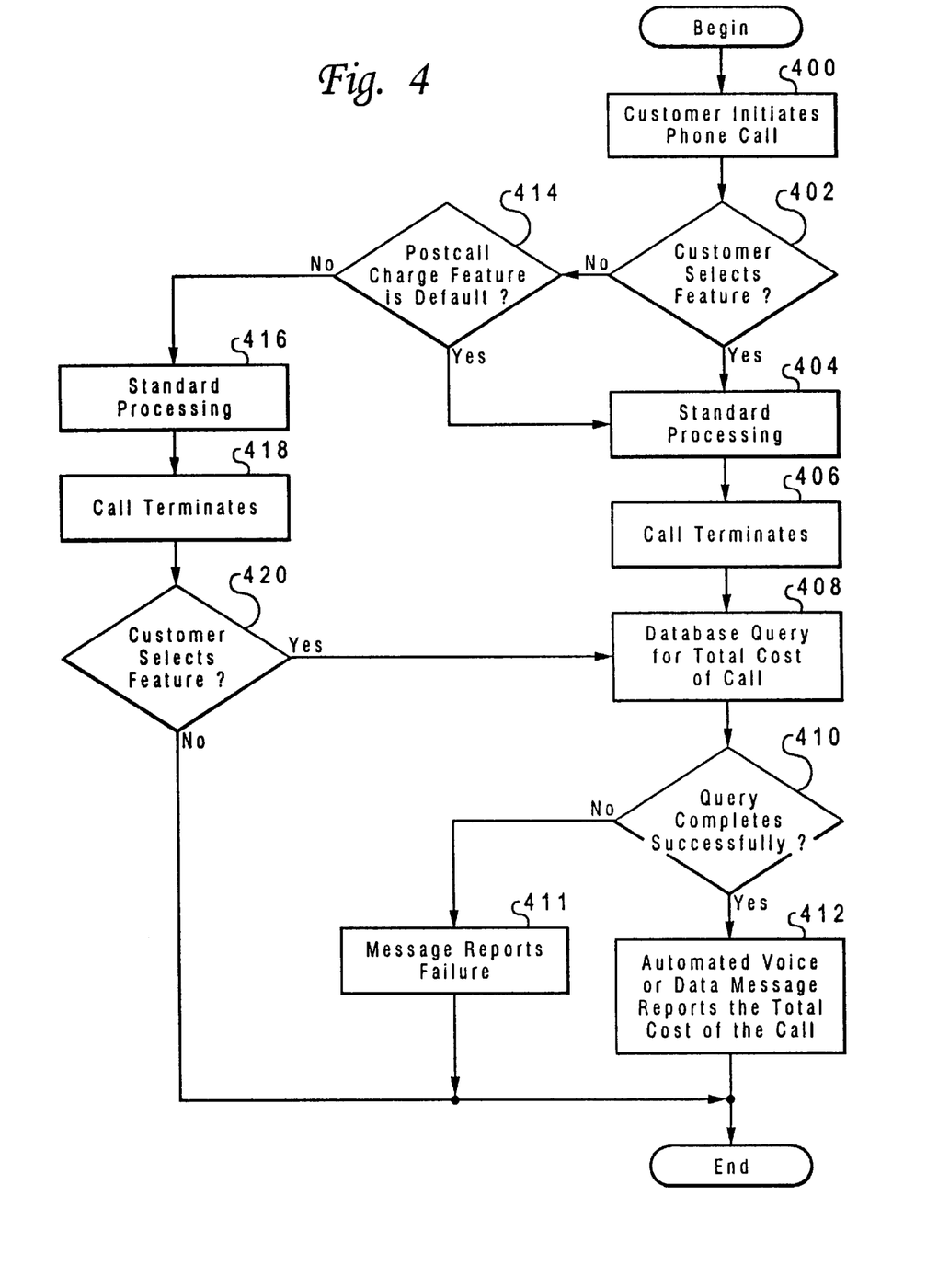
FIG. 4 is a flowchart of a process for providing post call charge information in accordance with the preferred embodiment of the present invention.

With reference now to FIG. 4, a flowchart of a process for determining post call charge information is illustrated in accordance with the preferred embodiment of the present invention. The process begins with the initiation of a phone call from a customer through a communications unit (step 400). A determination is made as to whether a customer has selected the post call charge information feature (step 402). The customer may select this post call information feature by prefixing the call with a special dialing option such as "*58". The indication that the post call charge information is desired also may be accomplished through PRI data messaging. Alternatively, the customer may be prompted through a voice prompt or a data message to indicate whether the post call charge feature is desired. If the customer has selected the feature, the process proceeds to standard processing of the call (step 404). Standard processing for the call involves the procedures normally used to connect a caller at a source communications unit to a called party at a target communications unit within a communications system.

The process then detects a termination of the call (step 406) and queries a customer database to determine the total cost of the completed call (step 408). A determination is then made as to whether the query has been successfully completed (step 410). If the query is successfully completed, the process then presents the post call charge information to the caller through an automated voice message or data message that reports the total cost of the call (step 412) with the process terminating thereafter. For example, if a voice message is used, the process may send the following message: "The cost of your call to (817) 679-2600 at 3:52 p.m. is $6.85 and your call lasted 28 minutes". With reference again to step 410, if the query to the customer database for charge information is not successfully completed, the process sends an automated voice or data message reporting that the query has failed (step 411). In this instance, the call completes without providing the caller a message containing the post call charge information. Alternatively, a message may be provided to the caller stating that the system is presently unable to determine the post call charge information.

With reference again to step 402, if the customer has not selected the post call charge information feature, a determination is made as to whether the post call charge feature is a default (step 414). If the post call charge feature is a default feature, the process then proceeds to step 404 as described above. The post call charge feature can be a standard or a default feature that is present each time a customer initiates a phone call that involves charges. On the other hand, if the post call charge feature is not a default feature, the process proceeds to step 416 for standard processing of the call. The process then detects a termination of the call (step 418), and then a determination is made as to whether the customer has sent a signal indicating selection of the post call charge feature (step 420). If the customer has selected the feature, the process then proceeds to step 408, as described above. If the customer has not selected the feature, the process ends.

The flowchart in FIG. 4 illustrates three places at which the post-call charges query may be activated—activation as a default service, initiated prior to the call of interest, or initiated after the call of interest has taken place. If the charge message is given as a voice announcement, then it takes some time for the customer to listen to the message. A number of reasons may exist for which a customer may not wish to hear this announcement for every potentially billable call, such as a) the called party did not answer, so no charges were incurred; b) the call was very brief, so the customer may be unconnected about the charges; c) the customer needs to attend to something else, and is unavailable to listen to the announcement; or d) the customer desires to immediately make another call. Therefore, having the service enabled by default may be unconcerned if the message is delivered as a voice announcement. By comparison, a data message, which may, for instance, show up as a message on a display similar to a caller-id box, may be readily ignored by the customer, so enabling the service as a default might be appropriate for a data-message implementation of the service (unless, of course, the customer is charged per use).

Post-call activation of the service is preferable in some cases. A customer may not decide that the service is useful until the customer has been on the phone for an extended period of time. After completing the call, the customer knows whether he/she is interested in finding out the charges on the call the customer just completed, so a post-call activation makes sense when possible. Unfortunately, if the call requires an extended procedure to obtain access for making a call, then this procedure must be repeated if the customer has disconnected from the phone call. For example, if a customer makes a long distance phone call using a calling card, then the customer first dials a toll-free access number, waits for a prompt, enters an authorization code, waits for another prompt, and then enters in the called number. After disconnecting from the phone call, simply picking up the phone and dialing "*58" (for example) could not work, because these digits get sent to the local service provider rather than the company that provides the calling card service. Therefore, the customer would have to redial the access number and authorization code to reconnect to the service provider before activating the post-call charges query. One way around this is to take advantage of reorigination if available.

Some call types require a customer to call an access number and then enter in an authorization code before dialing the called number. To make subsequent calls easier, some providers offer reorigination, which allows a customer to make a subsequent call by pressing the "#" button followed by another called number. Thus, reorigination allows the customer to only enter the access number and authorization code once when making more than one call. The current process may build upon reorigination to allow the customer to activate the post-call charges feature rather than another called number.

Figure 5:
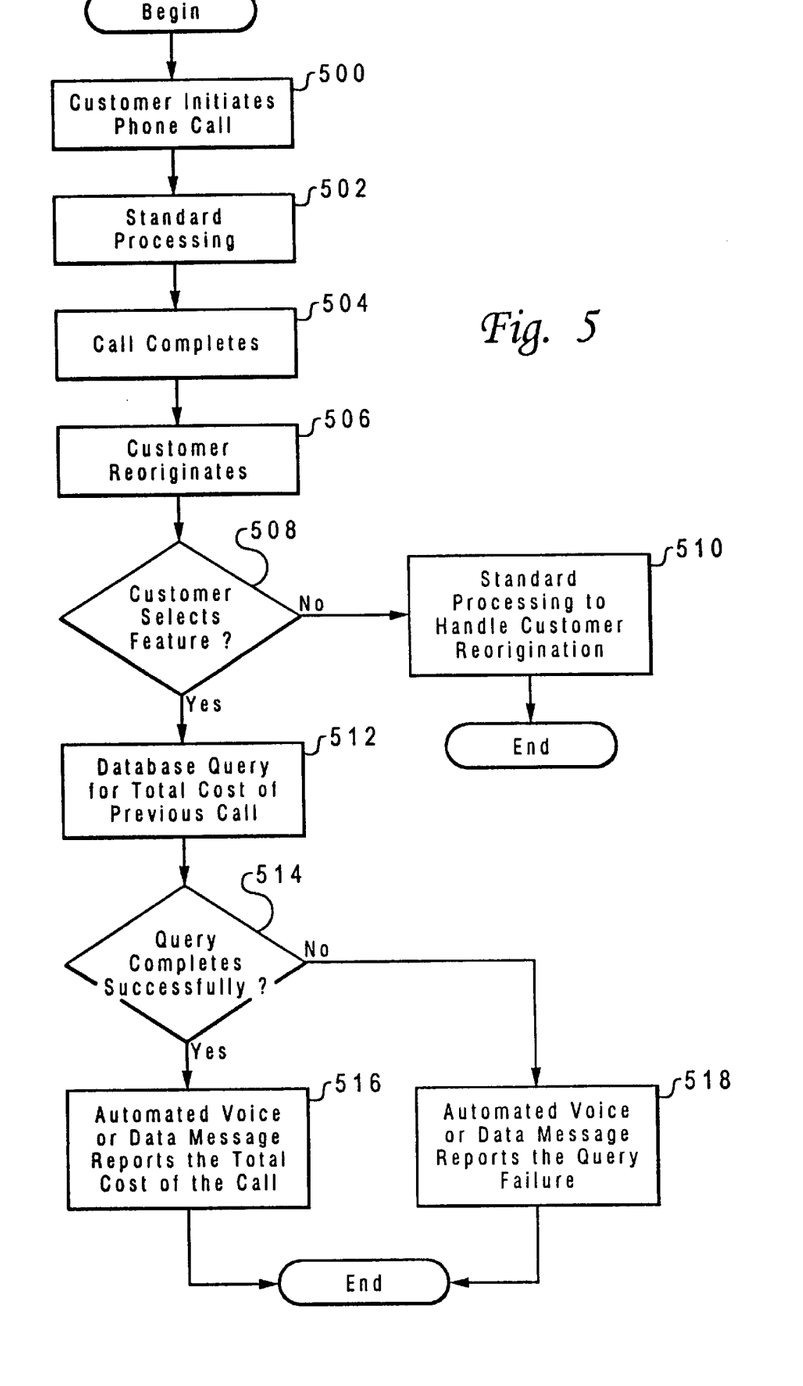
FIG. 5 is a flowchart of a process for providing post call charge information involving calling card services that allow reorigination in accordance with a preferred embodiment of the present invention.

Turning now to FIG. 5, a flowchart of a process for providing post-call charge information involving calling card services that allow reorigination is depicted in accordance with a preferred embodiment of the present invention. The process begins by the initiation of a phone call by a customer (step 500). Standard processing of the phone call occurs (step 502), and then the call completes (step 504). The customer initiates reorigination (step 506) and a determination is made as to whether the customer selects the post call charge feature (step 508). If the customer does not select the post call charge feature, the process then initiates standard processing to handle customer reorigination (step 510) with the process terminating thereafter.

If the customer selects the post call charge feature, a database query for the total cost of the previous call is made (step 512). A determination is then made as to whether the query is successfully completed (step 514). Successful completion of the query results in an automated voice or data message recording the total cost of the call to the customer (step 516) with the process terminating thereafter. If the query is not successful, an automated voice or data message reports that the query has failed (step 518) with the process terminating thereafter.

Figure 6:
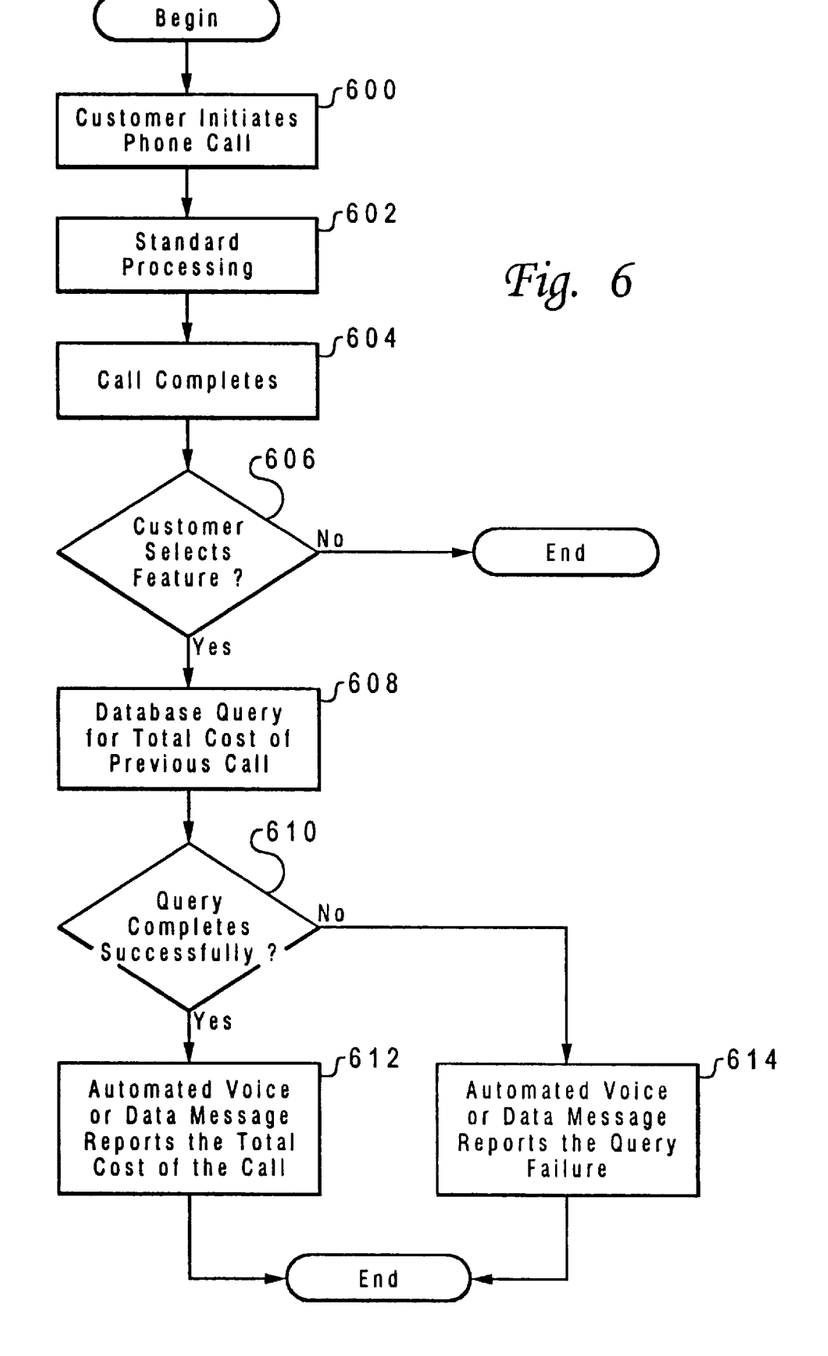
FIG. 6 is a flowchart of a process for providing post call charge information involving a direct dialed call in accordance with a preferred embodiment of the present invention.

Turning next to FIG. 6, a flowchart of a process for providing post call charge information involving direct dialed services, not requiring an access number authorization code, is depicted in accordance with a preferred embodiment of the present invention. The process begins by the initiation of a phone call by a customer (step 600). Standard processing of the phone call occurs (step 602), and then the call completes (step 604). A determination is made as to whether the customer selects the post call charge feature (step 606). If the customer does not select the post call charge feature, the process then terminates.

If the customer selects the post call charge feature, a database query for the total cost of the previous call is made (step 608). A determination is then made as to whether the query is successfully completed (step 610). Successful completion of the query results in an automated voice or data message recording the total cost of the call to the customer (step 612) with the process terminating thereafter. If the query is not successful, an automated voice or data message reports that the query has failed (step 614) with the process terminating thereafter.

Figure 7:
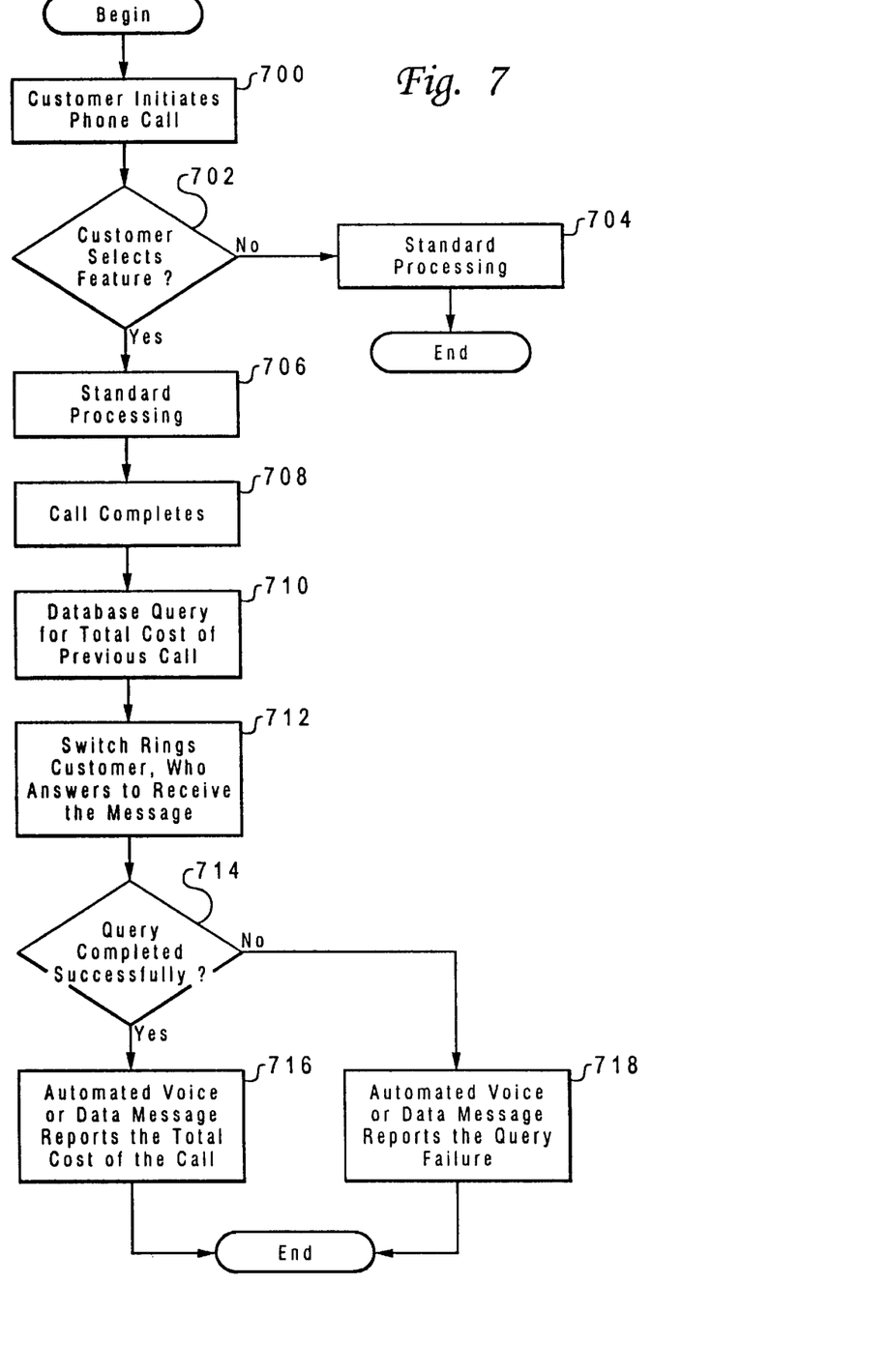
FIG. 7 is a flowchart of a process for providing post call charge information involving pre-call activation of the feature in accordance with a preferred embodiment of the present invention.

Turning now to FIG. 7, a flowchart of a process for providing post call charge information involving pre-call activation of the feature is depicted in accordance with a preferred embodiment of the present invention. If post call or default activation is unsuitable, the process begins by initiation of the call by a customer (step 700). A determination is then made as to whether the customer selects the feature providing post call charge information (step 702). If the customer does not select the feature, then standard processing of the call occurs (step 704) with the process terminating thereafter. Selection of the feature results in standard processing of the call (step 706) with a completion of the call thereafter (step 708). After completion of the call, the process queries the database for the total cost of the call (step 710). The process then rings the customer who then answers the call to receive the message (step 712). A determination is made as to whether the database query has been successfully completed (step 714). If the database query completes successful, the process sends an automated voice or data message that reports the total cost of the call (step 716) with the process terminating thereafter. If the query is unsuccessful, the process sends an automated voice or data message reporting that the query has failed (step 718) with the process terminating thereafter.

Figure 8:
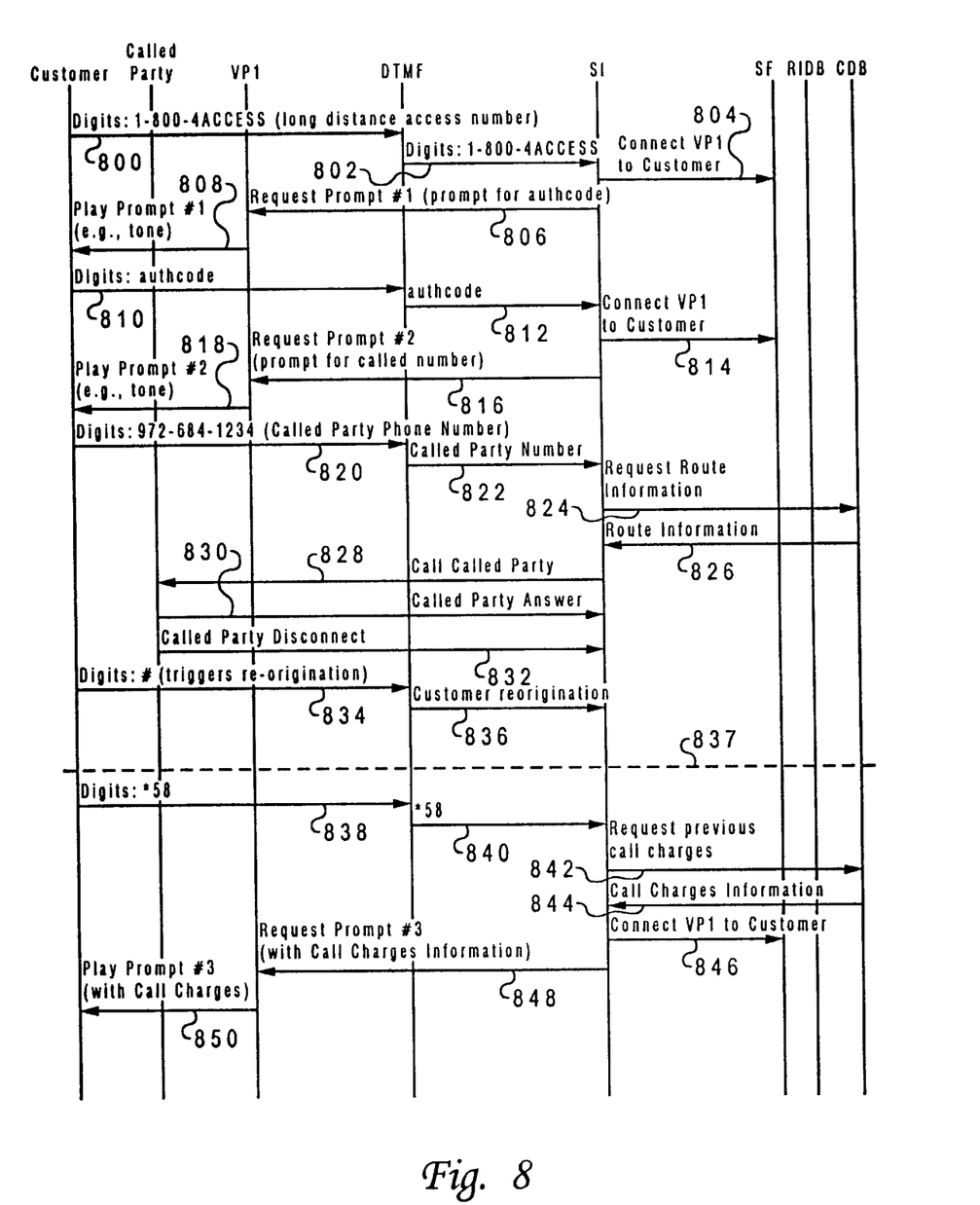
FIG. 8 is a functional message flow diagram for providing post call charge information involving a card call that allows reorigination in accordance with a preferred embodiment of the present invention.

Turning now to FIG. 8, a functional message flow diagram for providing post call charge information involving a card call that allows reorigination is depicted in accordance with a preferred embodiment of the present invention. The process begins by the customer dialing a long distance access number, which is received by a DTMF detector within a data processing system (step 800). The DTMF detector sends the number to the switch intelligence (SI) within the data processing system (step 802). In response to receiving the number, the SI sends a message to the switch fabric (SF) to connect the customer to voice port, VP1 (step 804). The SI also sends a request to send a prompt, prompt number 1, to the customer for an authorization code (step 806). In response, prompt number 1 is sent to the customer through VP1 (step 808). This prompt may be in the form of a tone.

In response to receiving the prompt, the customer enters the authorization code, which is received by the DTMF detector (step 810). This authorization code is sent to the SI (step 812), which results in the SI sending a message to SF to connect the customer to VP1 (step 814). The SI also sends a request for a second prompt, prompt number 2, to be sent to the customer through VP1 (step 816). Prompt number 2 is a prompt for the called number. In response, prompt number 2 is played to the customer through VP1 (step 818). In the depicted example, prompt number 2 is a tone. In response, the customer enters the phone number of the called party, which is detected by the DTMF detector (step 820). The number is sent to the SI (step 822), which in turn requests routing information from the routing information database (RIDB) (step 824). Routing information is returned to the SI from the RIDB (step 826). The SI calls the called party using the route information (step 828). An answer is received by the SI from the called party (step 830).

In the depicted example, at some point in time, the called party disconnects the call (step 832). The customer enters a "#", which is detected by the DTMF detector after the called party disconnects the call (step 834). This "#" symbol is employed to trigger a reorigination. This customer reorigination is forwarded to the SI (step 836). Line 837 indicates that the call has been completed. The messages below line 837 occur after completion of the call. Messages below line 837 are messages used to provide the post call information functions in accordance with a preferred embodiment of the present invention. The customer then enters an indication that the customer desires to receive post call charge information (step 838). In the depicted example, this indication is in the form of a "*58". This indication is forwarded to the SI (step 840). In response to receiving the indication, the SI requests previous call charges from a customer database (CDB) (step 842). Call charge information is returned to the SI (step 844), which results in the SI sending a request to the SF to connect the customer to VP1 (step 846). Thereafter, the SI requests prompt number 3 to be sent to the customer through VP1 (step 848). Prompt number 3 is a message containing call charge information. Thereafter, prompt number 3 is played to the customer through VP1 (step 850).

Figure 9:
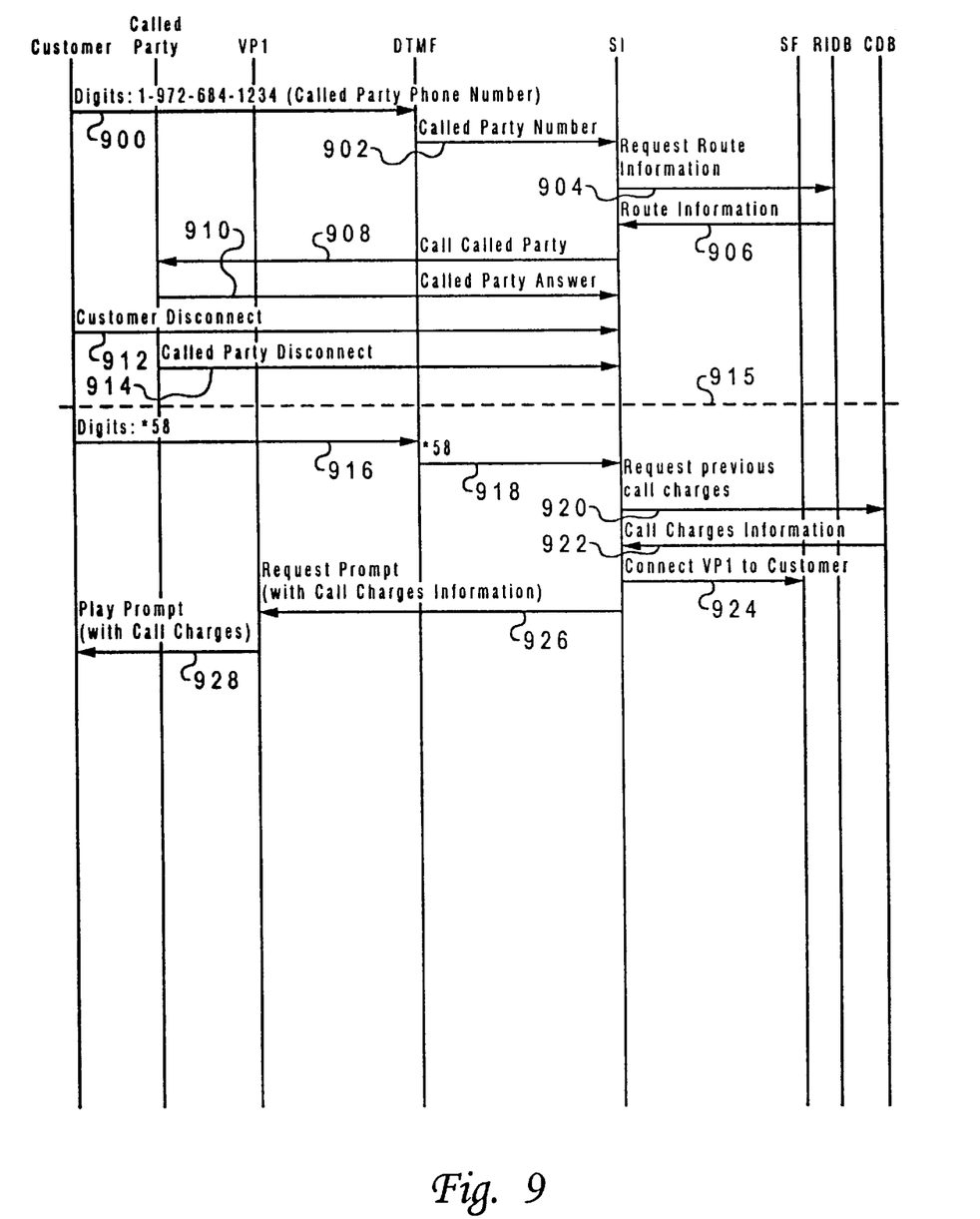
FIG. 9 is a functional message flow diagram for providing post call charge information involving a direct dialed call in accordance with a preferred embodiment of the present invention.

Turning now to FIG. 9, a functional message flow diagram for providing post call charge information involving a direct dialed call is depicted in accordance with a preferred embodiment of the present invention. The process begins with the customer entering the phone number of the called party, which is detected by the DTMF detector (step 900). The number is sent to the SI by the DTMF detector (step 902), which in turn requests routing information from the routing information database (RIDB) (step 904). Routing information is returned to the SI from the RIDB (step 906). The SI calls the called party using the route information (step 908). An answer is received by the SI from the called party (step 910). In the depicted example, at some point in time, the customer disconnects the call (step 912). Thereafter, the called party disconnects the call (step 914).

Line 915 in FIG. 9 indicates that the call has been terminated or completed. The messages below line 915 occur after termination of the call. Following termination of the call, the customer enters an indication that the customer desires post-call charge information (step 916). In the depicted example, this indication is in the form of a "*58". This indication is forwarded to the SI (step 918). In response to receiving the indication, the SI requests the previous call's charges from a customer database (CDB) (step 920). Call charge information is returned to the SI (step 922), which results in the SI sending a request to the SF to connect the customer to voice port, VP1 (step 924). Thereafter, the SI requests a prompt to be sent to the customer through VP1 (step 926). The prompt is a message containing call charge information. Thereafter, the prompt is played to the customer through VP1 (step 928).

Figure 10:
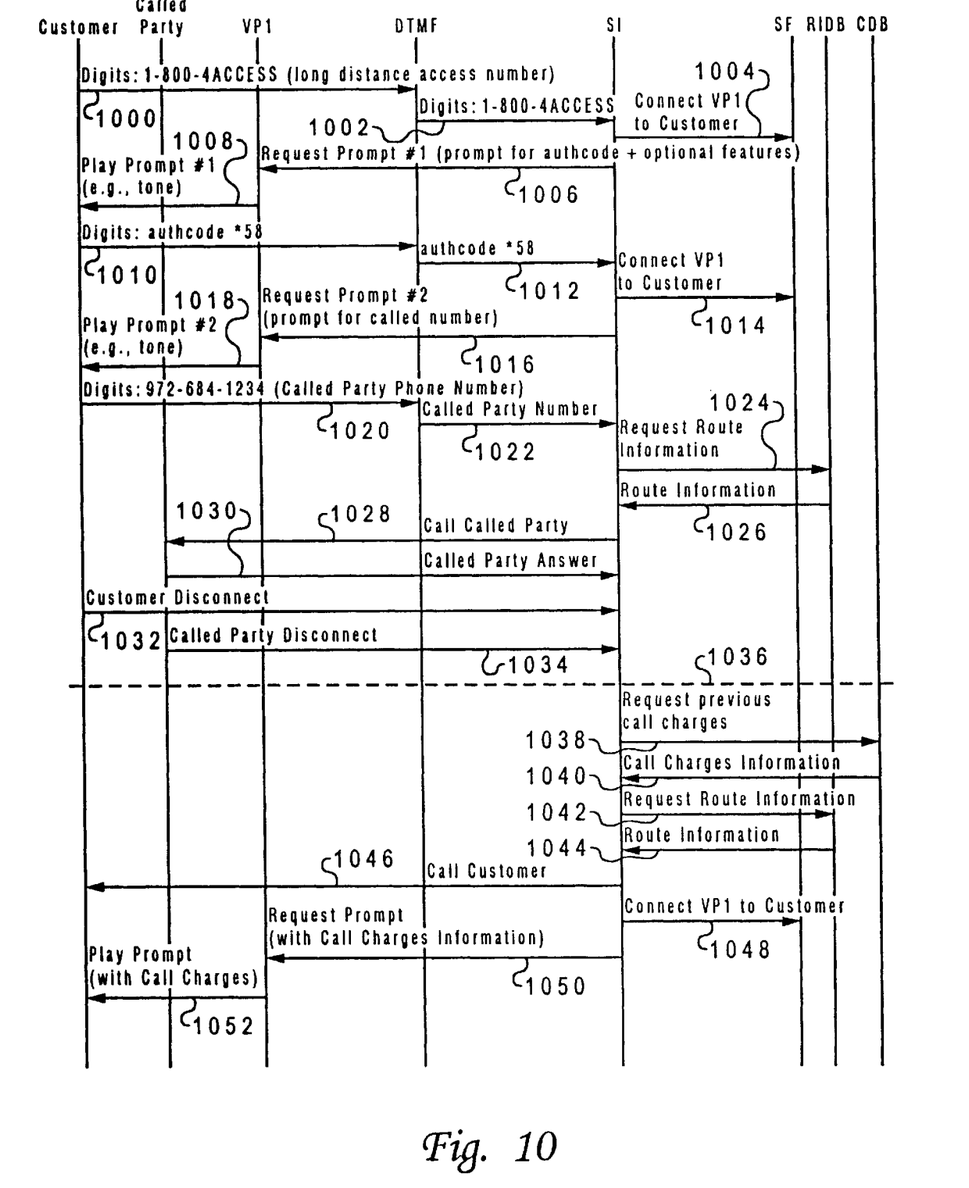
FIG. 10 is a functional message flow diagram for providing post call charge information involving pre-call activation in accordance with a preferred embodiment of the present invention.

Turning now to FIG. 10, a functional message flow diagram for providing post call charge information involving pre-call activation is depicted in accordance with a preferred embodiment of the present invention. The process begins by the customer dialing a long distance access number, which is received by a DTMF detector within a data processing system (step 1000). The DTMF detector sends the number to the switch intelligence (SI) within the data processing system (step 1002). In response to receiving the number, the SI sends a message to the switch fabric (SF) to connect the customer to a voice port, VP1 (step 1004). The SI also sends a request to send a prompt, prompt number 1, to the customer for an authorization code (step 1006). In response, prompt number 1 is sent to the customer through VP1 (step 1008). This prompt may be in the form of a tone.

In response to receiving the prompt, the customer enters the authorization code to activate the post-call charge information feature, which is received by the DTMF detector (step 1010). In the depicted example, this authorization code is followed by a "*58", which is employed to enable the post call charge information feature. This authorization code is sent to the SI (step 1012), which results in the SI sending a message to SF to connect the customer to VP1 (step 1014). The SI also sends a request for a second prompt, prompt number 2, to be sent to the customer through VP1 (step 1016). Prompt number 2 is a prompt for the called number. In response, prompt number 2 is played to the customer through VP1 (step 1018). In the depicted example, prompt number 2 is a tone. In response, the customer enters the phone number of the called party, which is detected the DTMF detector (step 1020). The number is sent to the SI (step 1022), which in turn requests routing information from the routing information database (RIDB) (step 1024). Routing information is returned to the SI from the RIDB (step 1026). The SI calls the called party using the route information (step 1028). An answer is received by the SI from the called party (step 1030). In the depicted example, the customer disconnects the call (step 1032) and then the called party disconnects the call (step 1034). Line 1036 indicates that the call has been completed. The messages below line 1036 occur after termination of the call.

Next, the SI then requests previous call charges from the CDB (step 1038). In response, the CDB sends the called charge information to the SI (step 1040). After receiving the called charge information, the SI requests routing information for the RIDB (step 1042). The RIDB returns routing information to the SI (step 1044). The SI then calls the customer using the routing information (step 1046). After calling the customer, the SI sends a request to the SF to connect the customer to VP1 (step 1048). The SI sends a request to play a prompt to the customer (step 1050). This prompt contains call charge information. In response, the prompt with the call charge information is played to the customer using VP1 (step 1052).

It is important to note that while the present invention has been described in the context of a communications system including processors for processing instructions to provide the functions described, the processes of the present invention are capable of being distributed in the form of a computer readable medium of instructions in a variety of forms that the present invention applies equally regardless of the particular type of signal bearing media actually used to carry out the distribution. Examples of computer readable media include: recordable-type media such as floppy disks and CD ROMs and transmission-type media such as digital and analog communications links.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method for providing post call information to a caller, comprising:

responsive to initiation of a call,
determining whether a request for post call charge information for the call has been received, and
determining whether a default feature for a customer initiating the call requires presentation of post call charge information; and responsive to determining either that a request for post call charge information for the call has been received or that the default feature for the customer initiating the call requires presentation of post call charge information,
identifying the call for which post call information is desired;
automatically identifying the post call charge information for the call in response to termination of the call; and
automatically presenting the post call charge information to the caller in response to automatically identifying the post call charge information for the call.

2. The method of claim 1, wherein the step of presenting the post call charge information to the caller comprises sending a voice message containing the post call charge information to the caller.

3. The method of claim 1, wherein the step of presenting the post call charge information to the caller comprises sending a data message containing the post call charge information to the caller.

4. The method of claim 1, wherein the step of automatically identifying the post call charge information for the call comprises querying a database containing data about the caller and billing information for calls.

5. The method of claim 1, wherein the step of detecting a request for post call charge information includes detecting a pre-selected signal from the caller prior to completing the call.

6. The method of claim 1, wherein the step of detecting a request for post call charge information includes detecting a pre-selected signal from the caller prior to connecting the caller to a called party.

7. The method of claim 1 further comprising:
determining whether the caller has sent an indication that post call charge information is required to an absence of detecting a connection of the caller to the communications system in which the caller initiated a call for which post call charge information is desired; and
in response to an absence of a condition in which a default is present requiring post charge information, automatically identifying the post call charge information for the call in response to termination of the call by the caller and automatically presenting the post call charge information to the caller prior to terminating the connection to the caller in response to automatically identifying the post call charge information for the call.

8. A method in a communications system for providing post call charge information to a caller comprising:
determining whether post call charge information for a call is required by
determining whether a request for post call charge information for the call has been received, and
determining whether a default feature for a customer initiating the call requires presentation of post call charge information;
determining that post call charge information for the call is required if either a request for post call charge information for the call has been received or the default feature for the customer initiating the call requires presentation of post call charge information;
detecting initiation of a call by the caller for which post call charge information is required;
connecting the caller to a called party before beginning the call;
monitoring the call to detect a termination of the call between the caller and the called party;
querying a database to obtain the post call charge information in response to detecting a termination of the call; and
presenting the post call charge information to the caller.

9. The method of claim 8, wherein the step of detecting initiation of a call by the caller for which post call charge information is required includes determining whether the caller has sent a signal indicating that the post call charge information is required.

10. The method of claim 8 further comprising:
determining whether a default is present requiring post call charge information in response to a determination that the caller has not sent a signal.

11. A communications system comprising:
a network providing a plurality of communications paths;
a plurality of communications units connected to the network; and
a switch connected to the plurality of communications paths, wherein the switch
determines whether post call charge information for a call is required by
determining whether a request for post call charge information for the call has been received, and
determining whether a default feature for a customer initiating the call requires presentation of post call charge information;
determines that post call charge information for the call is required if either a request for post call charge information for the call has been received or the default feature for the customer initiating the call requires presentation of post call charge information;
detects a request for post call charge information from a source communications unit within the plurality of communications units,
detects a termination of the call,
determines the charge for the call to form post call charge information, and
presents the post call charge information to the source communications unit.

12. The communications system of claim 11, wherein in presenting the post call charge information to the source communications unit, the switch sends a voice message to the source communications unit.

13. The communications system of claim 11, wherein in presenting the post call charge information to the source communications unit, the switch sends a data message to the source communications unit.

14. The communications system of claim 11, wherein the source communications unit is a land based communications unit.

15. The communications system of claim 11, wherein the source communications unit is a wireless communications unit.

16. A data processing system in a communications system for providing a charge for a call to a caller after a termination of the call, the data processing system comprising:
determination means for determining whether post call charge information for a call is required by
determining whether a request for post call charge information for the call has been received, and
determining whether a default feature for a customer initiating the call requires presentation of post call charge information,
wherein the determination means determines that post call charge information for the call is required if either a request for post call charge information for the call has been received or the default feature for the customer initiating the call requires presentation of post call charge information;
detection means for detecting the call for the charge is required;
identification means for automatically identifying the charge for the call after the termination of the call; and
presentation means for presenting the charge for the call to the caller.

17. The data processing system of claim 16, wherein the data processing system is a switch.

18. The data processing system of claim 16, wherein the data processing system is a computer.

19. A switch for use in a communications system comprising:
a plurality of modes of operation including:
a first mode of operation in which the switch is connected to a source communications unit initiating a call in which post call charge information is to be sent to the source communications unit, wherein the switch determines whether post call charge information for a call is to be sent to the source communications unit by
determining whether a request for post call charge information for the call has been received, and
determining whether a default feature for a customer initiating the call requires presentation of post call charge information,
wherein the switch determines that post call charge information for the call is to be sent to the source communication unit if either a request for post call charge information for the call has been received or the default feature for the customer initiating the call requires presentation of post call charge information;
a second mode of operation in which the switch connects the source communications unit to a target communications unit to begin the call;
a third mode of operation, responsive to the switch connecting the source communications unit to the target communications unit, in which the switch waits for the call to be terminated;
a fourth mode of operation, responsive to detecting a termination of the call in the third mode of operation, in which the switch determines the post call charge information for the call; and
a fifth mode of operation, responsive to the switch determining the post call charge information for the call in the fourth mode of operation, in which the switch sends the post call charge information to the communications unit.

20. The switch of claim 19, wherein the fifth mode of operation sends the post call charge information to the communications unit as a voice message.

21. The switch of claim 19, wherein the communications system is an integrated services digital network supporting data messages and wherein the fifth mode of operation sends the post call charge information to the communications unit as a data message.

22. A computer program product for use with a data processing system in a communications system for providing post call charge information to a caller, the computer program product comprising:
a computer usable medium;
first instructions for detecting connection of the caller to the communications system in which the caller is initiating a call for which post call charge information is desired, wherein the first instructions determine whether post call charge information for a call is required by
determining whether a request for post call charge information for the call has been received, and
determining whether a default feature for a customer initiating the call requires presentation of post call charge information,
wherein the first instructions determines that post call charge information for the call is required if either a request for post call charge information for the call has been received or the default feature for the customer initiating the call requires presentation of post call charge information;
second instructions for automatically identifying the post call charge information for the call in response to termination of the call by the caller;
third instructions for automatically presenting the post call charge information to the caller prior to terminating the connection to the caller; and
wherein the instructions are embodied within the computer usable medium.

23. A communications system comprising:
a network providing a plurality of communications paths;
a plurality of communications units connected to the network;
determination means for determining whether post call charge information for a call is required by
determining whether a request for post call charge information for the call has been received, and
determining whether a default feature for a customer initiating the call requires presentation of post call charge information,
wherein the determination means determines that post call charge information for the call is required if either a request for post call charge information for the call has been received or the default feature for the customer initiating the call requires presentation of post call charge information;
first detection means for detecting initiation of a call from a source communications unit within the plurality of communications units for which post call charge information is required;
second detection means for detecting a termination of the call;
determination means for determining the charge for the call to form post call charge information; and
transmission means for sending the post call charge information to the source communications unit.

24. The communications system of claim 23, wherein the transmission means sends the post call charge information to the communications unit as a voice message.

25. The communications system of claim 23, wherein the communications system is an integrated services digital network supporting data messages and wherein the transmission means sends the post call charge information to the communications unit as a data message.

26. The communications system of claim 23, wherein the first detection means includes:
means for determining whether the communications unit has sent a signal indicating that post call charge information is required; and
means for determining whether the signal is required to indicate that post call charge information is required.

27. A method in a communications system for providing post call information to a caller using a data processing system within the communications system, the method comprising data processing system implemented steps of:
determining whether post call charge information for a call is desired by
determining whether a request for post call charge information for the call has been received, and
determining whether a default feature for a customer initiating the call requires presentation of post call charge information;
wherein post call charge information for the call is determined to be desired if either a request for post call charge information for the call has been received or the default feature for the customer initiating the call requires presentation of post call charge information;

detecting connection of the caller to the communications system in which the caller is initiating a call to a called party for which post call charge information is desired;

automatically identifying the post call charge information for the call in response to termination of the call between the caller and the called party; and automatically presenting the post call charge information to the caller in response to automatically identifying the post call charge information for the call.

28. The method of claim 27, wherein the step of detecting connection of the caller to the communications system in which the caller is initiating a call to a called party for which post call charge information is desired includes detecting a pre-selected signal from the caller after completing the call.

29. The method of claim 27, wherein the step of detecting connection of the caller to the communications system in which the caller is initiating a call to a called party for which post call charge information is desired includes detecting a pre-selected signal from the caller prior to connecting the caller to a called party.

30. The method of claim 27, wherein the step of detecting connection of the caller to the communications system in which the caller is initiating a call to a called party for which post call charge information is desired includes identifying a default condition in which post call charge information is to be provided.

31. The method of claim 27, wherein the step of automatically presenting the post call charge information to the caller in response to automatically identifying the post call charge information for the call comprises presenting the call charge information to the caller prior to the caller disconnecting from the communications system.

32. The method of claim 27, wherein the step of automatically presenting the post call charge information to the caller in response to automatically identifying the post call charge information for the call comprises placing a new call to the caller and presenting the post call charge information to the caller in response to the caller answering the new call.

* * * * *